C. A. Seely,
Oil Still.
No. 87,207.      Patented Feb. 23, 1869.
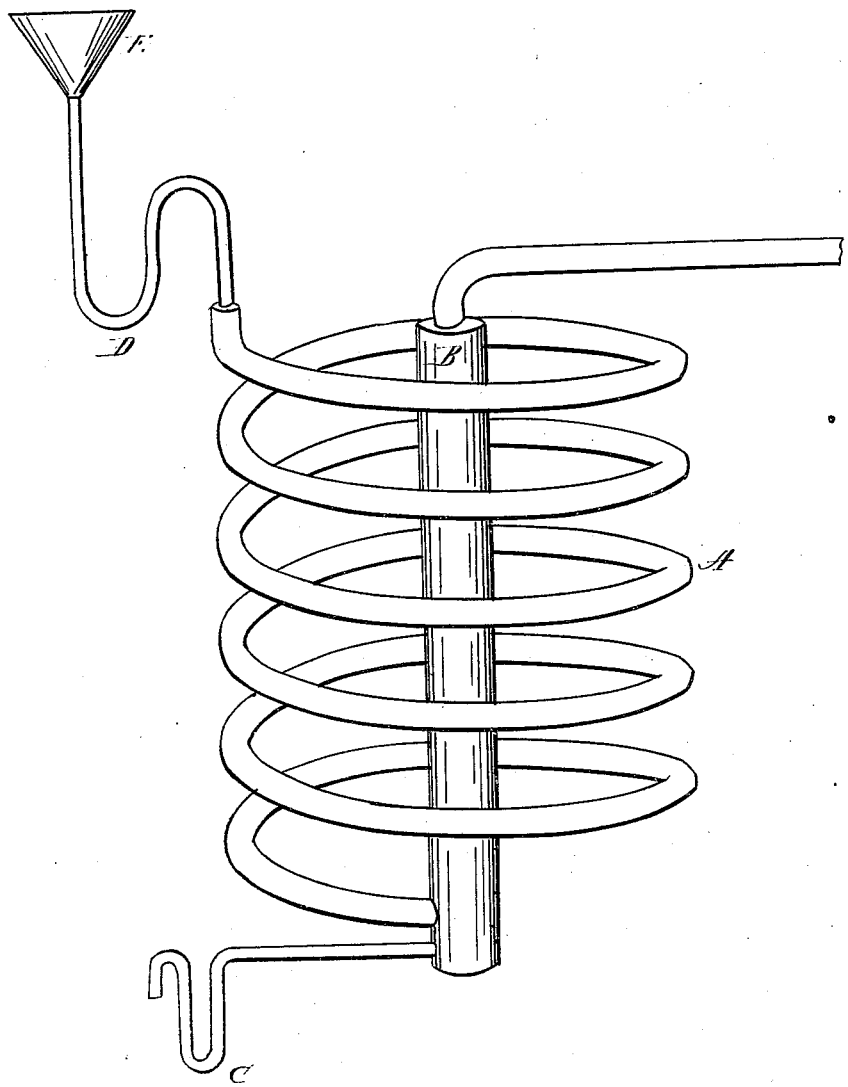
Witnesses
H. F. Walling
Eben P. Couch
Inventor
Charles A. Seely

CHARLES A. SEELY, OF NEW YORK, N. Y.

*Letters Patent No. 87,207, dated February 23, 1869.*

IMPROVED APPARATUS FOR DISTILLING AND SEPARATING OILS, FATS, AND THE LIKE.

The Schedule referred to in these Letters Patent and making part of the same.

*To all whom it may concern:*

Be it known that I, CHARLES A. SEELY, of New York, in the county of New York, in the State of New York, have invented a new and improved Apparatus for Distillation; and I do hereby declare that the following is a full and exact description thereof, reference being had to the accompanying drawings, and to the letters of reference marked thereon.

The nature of my invention consists in making the still in the form of a coil, the coil, terminating, at its lower end, in a pipe, which rises upward, serves as a conduit of vapor to the condenser, and furnishing the coil, at its lowest point, with a tube, leading downward, and serving to carry away the liquid which it is not desired to volatilize.

In using the apparatus, the coil and the uprising pipe are placed in a suitable heating-medium, when the liquid to be operated on is fed in at the top of the coil. The liquid descending is gradually heated and vaporized, and the vapor escapes, by means of the uprising pipe, to the condenser, while the unvolatilized or exhausted liquid flows away by the smaller pipe, attached to the bottom of the coil.

If the liquid be constantly fed into the coil while the heat is maintained, the whole operation becomes continuous, the vapor constantly passes to the condenser, and the exhausted liquid flows out at the drip-pipe.

To enable others skilled in the art to make and use my invention, I will describe it more minutely.

The drawing represents my apparatus in perspective.

A is a hollow coil.

B is a pipe, attached to the lower end of the coil, and leading to a condenser.

C is a pipe, of smaller diameter than that of the coil-pipe, and attached at the bottom of the coil.

D is a feed-pipe, at the top of the coil.

E is a funnel, attached to the feed-pipe.

To illustrate the operation of my invention, I will describe its use for certain purposes to which it is especially well adapted.

First. For the separation of fixed oils from solvents which boil at a temperature below 212°, as, for example, the separation of castor-oil from its solution in ether, bisulphide of carbon, or light hydrocarbons. In this case, I find water a suitable heating-medium, and I immerse the coil, with its uprising pipe, in a vessel of water, and provide that the drip-pipe C shall pass through the side of the vessel containing water. I heat the water to the boiling-point by blowing into it steam, by steam-pipes, circulation of water, or other convenient method. I then allow the oil-solution to flow steadily into the funnel E. When this flow is properly adjusted, the fixed oil will flow from the drip-pipe nearly free from solvent, while the solvent, in the form of vapor, rises and escapes, by the pipe B, to the condenser.

Second. In the separation of benzine or gasoline from burning-oil, I arrange the apparatus as in the above example. The mixture of oils, which may be what is termed crude oil, flows steadily into the funnel, and the heavier portion escapes at the drip-pipe, and the benzine escapes, in vapor, to the condenser.

Third. To separate mixed benzines or gasolines, I keep the water surrounding the coil at a temperature which shall be the highest boiling-point of what is to be vaporized. I feed in the mixture as before, and receive the heavy product from the drip-pipe, and the lighter at the condenser.

These examples pretty plainly indicate the methods of using the apparatus in all cases of distillation; but I will make some remarks about some cases different from those above described, where a higher temperature than 212° must be employed.

For temperatures but little above 212°, a saline or oil-bath is available, and, for a heating-medium which will bear 500° and upward, a metallic bath is available. I prefer to use the heating-medium in the liquid form, for the reason that, by such means, the heat can be communicated more steadily and uniformly.

I have represented my still, thus far, only in the form of a coil; but I have done this mainly for the sake of clearer explanation.

I have now to remark that the pipe of the coil is not necessarily round, nor is the form of the coil essential. Instead of a coil-form, the pipe carrying the descending liquid may take a zigzag direction, as in a stack or frame of heating-pipes, &c.

The essential feature of my invention is a descending conduit of liquid to be distilled, surrounded by a liquid-heating medium, the said conduit being provided with an uprising pipe, or chamber, and a drip-pipe, as above described.

The inlet-pipe at the top of the coil is bent in the form of the letter S, and also the drip-pipe in the part which is outside of the vessel containing the heating-medium. The purpose of the first S-pipe is to prevent the access of air into the coil, and to prevent an escape of vapor in case the vapor is formed faster than it can be carried away by the escape-pipe. The purpose of the second S-pipe is to prevent the escape of vapor through the drip-pipe, and also, by means of the liquid contained in its lower bend, to serve as a resistance against the vapor in the uprising pipe, thus securing the prompt escape of the vapor. The S-pipes, or traps, are essential to the good working of my apparatus. The lower one is indispensable; without it, no vapor would rise in the uprising pipe.

What I claim, and desire to secure by Letters Patent, is—

1. The apparatus herein described.
2. The combination of the coil A, the pipe or chamber B, and the drip-pipe C.
3. The S-trap, in combination with the inlet-pipe, and the S-trap, in combination with the drip-pipe.

CHARLES A. SEELY.

Witnesses:
  H. F. WALLING,
  EBEN B. COUCH.